(12) United States Patent
Rozek et al.

(10) Patent No.: US 10,504,169 B2
(45) Date of Patent: Dec. 10, 2019

(54) PHOTO PRODUCT ENGINE POWERED BY BLOG CONTENT

(71) Applicant: Shutterfly, Inc., Redwood City, CA (US)

(72) Inventors: Joseph Andrew Rozek, Scottsdale, AZ (US); Jonathan Scott Delamater, Mesa, AZ (US); Wiley H Wang, Pacifica, CA (US); Craig Jorasch, Palo Alto, CA (US)

(73) Assignee: Shutterfly, LLC, Redwood City, CA (US)

( * ) Notice: Subject to any disclaimer, the term of this patent is extended or adjusted under 35 U.S.C. 154(b) by 901 days.

(21) Appl. No.: 13/905,458

(22) Filed: May 30, 2013

(65) Prior Publication Data

US 2013/0262261 A1    Oct. 3, 2013

Related U.S. Application Data

(63) Continuation-in-part of application No. 13/771,708, filed on Feb. 20, 2013, now Pat. No. 8,577,752, which is a continuation-in-part of application No. 13/177,326, filed on Jul. 6, 2011, now Pat. No. 8,412,589.

(60) Provisional application No. 61/371,337, filed on Aug. 6, 2010.

(51) Int. Cl.
*G06Q 30/00* (2012.01)
*G06Q 30/06* (2012.01)
*G06Q 50/00* (2012.01)

(52) U.S. Cl.
CPC ......... *G06Q 30/0621* (2013.01); *G06Q 50/01* (2013.01)

(58) Field of Classification Search
CPC ....................................... G06Q 30/0601–0645
USPC ............................................... 705/26.1–27.2
See application file for complete search history.

(56) References Cited

U.S. PATENT DOCUMENTS

| | | | |
|---|---|---|---|
| 2005/0177441 A1* | 8/2005 | Bryant | G06Q 30/0621 705/26.8 |
| 2005/0289018 A1* | 12/2005 | Sullivan | G06Q 30/00 705/26.5 |
| 2007/0239610 A1* | 10/2007 | Lemelson | G06Q 10/00 705/51 |
| 2011/0060437 A1* | 3/2011 | Durham, III | G06F 17/30265 700/97 |

OTHER PUBLICATIONS

Verio adds free blogging and photo gallery tools to help small businesses build internet communities, customer loyalty. (Oct. 5, 2006). Business Wire Retrieved from http://dialog.proquest.com/professional/docview/671180081?accountid=142257.*

* cited by examiner

*Primary Examiner* — Resha Desai
(74) *Attorney, Agent, or Firm* — Xin Wen

(57) ABSTRACT

A computer system for creating a design for a photo product includes servers that can identify a blog page that includes an image, text, or designs, automatically incorporate at least one of the image, text, or the design object in the blog page into the design of a photo product, and allow a user to review the design of the photo product. The servers communicate with a printing finishing facility that makes a physical photo product according to the design of the photo product.

20 Claims, 12 Drawing Sheets

PHOTO PRODUCT ENGINE POWERED BY BLOG CONTENT

The present application is a continuation-in-part application of and claims priority to commonly assigned U.S. patent application Ser. No. 13/771,708, titled "Photobook engine powered by blog content", filed on Feb. 20, 2013. U.S. patent application Ser. No. 13/771,708 is a continuation-in-part application of and claims priority to commonly assigned U.S. patent application Ser. No. 13/177,326 (issued as U.S. Pat. No. 8,412,589), titled "Photobook engine powered by blog content", filed on Jul. 6, 2011. U.S. patent application Ser. No. 13/177,326 claims priority to U.S. Provisional Patent Application 61/371,337, titled "Photobook engine powered by blog content", filed on Aug. 6, 2010. The disclosures of the above applications are incorporated herein by reference.

TECHNICAL FIELD

This application relates to utilization of digital images, and more specifically, to the design and creation of products incorporating digital images.

BACKGROUND OF THE INVENTION

In the last decade, photography has been rapidly transformed from chemical based technologies to digital imaging technologies. Images captured by digital cameras can be stored in computers and viewed on display devices. Users can also produce photo products based on the digital images. Such products include photo books, photo calendars, photo greeting cards and stationeries, photo mug, photo T-shirt, image prints, and so on. A photo book typically includes a cover page and a plurality of pages containing images. Designing a photobook can include many iterative steps such as selecting suitable images, selecting layout, selecting images for each page, selecting backgrounds, picture frames, overall Style, add text, choose text font, and rearrange the pages, images and text, which can be quite time consuming.

It is desirable to provide methods to allow users to design and produce photo products in a time efficient manner. In another aspect, it is also desirable to allow users to create photo products using content from different sources.

SUMMARY OF THE INVENTION

The disclosed methods and systems provide ways to save users' time spent on creating photo products such as photobooks. The disclosed methods and systems allow users to incorporate content from different sources into their photo products. Specifically, users can conveniently incorporate own images, text, and designs from web blog pages, which allows photo products to more effectively preserve users' memories.

In one general aspect, the present invention relates to a method for creating a design for a photo productphoto product. The method includes identifying a blog page that includes an image, text, or designs by a computer system; automatically incorporating at least one of the image, text, or a design object in the blog page into the design of a photo product by the computer system; and allowing a user to review the design of the photo product, wherein the computer system is configured to communicate with a printing finishing facility at which a physical photo product is to be made according to the design of the photo product.

Implementations of the system may include one or more of the following. The step of automatically incorporating can include obtaining the number of views received by the blog page; and selecting the blog page based on the number of views. The method can further include enabling the user to publish the blog page by the computer system; and tracking the number of views received by the blog page by the computer system. The step of automatically incorporating can include obtaining the number of votes on the blog page, the image, the text, or the design object; and selecting, by the computer system, the blog page, or at least one of the image, text, or the design object on the blog page based on the number of votes. The method can further include enabling the user to publish the blog page by the computer system; and tracking the number of votes on the blog page by the computer system. The step of automatically incorporating can include determining the image formats of the image by the computer system; automatically selecting a page layout according to the image format of the image; and automatically incorporating the image into the page layout which forms a portion of the design of the photo product. The step of automatically incorporating can include determining the image size of the image by the computer system; automatically selecting a page layout according to the image size of the image; and automatically incorporating the image into the page layout which forms a portion of the design of the photo product. The method can further include enabling the user to publish the blog page by the computer system. The photo product can include a photobook, a photo greeting card, or photo stationery. The blog page can be posted by the user. The method can further include receiving an order from the user for a physical photo product; and making the physical photo product according to the design of the photo product at the printing finishing facility. At least one of the image, text, or the design object in the blog page can be transferred to the computer system via a computer network. The computer system can include one or more servers.

In another general aspect, the present invention relates to a computer system for creating a design for a photo product. The system includes one or more servers that can identify a blog page that includes an image, text, or designs, automatically incorporate at least one of the image, text, or the design object in the blog page into the design of a photo product, and allow a user to review the design of the photo product. The one or more servers can communicate with a printing finishing facility that is configured to make a physical photo product according to the design of the photo product.

Implementations of the system may include one or more of the following. The one or more servers can obtain the number of views received by the blog page and select the blog page based on the number of views. The one or more servers can enable the user to publish the blog page and track the number of views received by the blog page. The one or more servers can obtain the number of votes on the blog page, the image, the text, or the design object and select the blog page, or at least one of the image, text, or the design object on the blog page based on the number of votes. The one or more servers can enable the user to publish the blog page and track the number of votes on the blog page. The one or more servers can determine the image formats of the image; automatically select a page layout according to the image format of the image; and automatically incorporate the image into the page layout which forms a portion of the design of the photo product. The one or more servers can determine the image size of the image, automatically select a page layout according to the image size of the image, and automatically incorporate the image into the page layout which forms a portion of the design of the photo product. The one or more servers can enable the user to publish the blog page. The photo product can include a photobook, a photo greeting card, or photo stationery.

These and other aspects, their implementations and other features are described in detail in the drawings, the description and the claims.

DETAILED DESCRIPTION OF THE INVENTION

Figure 1:
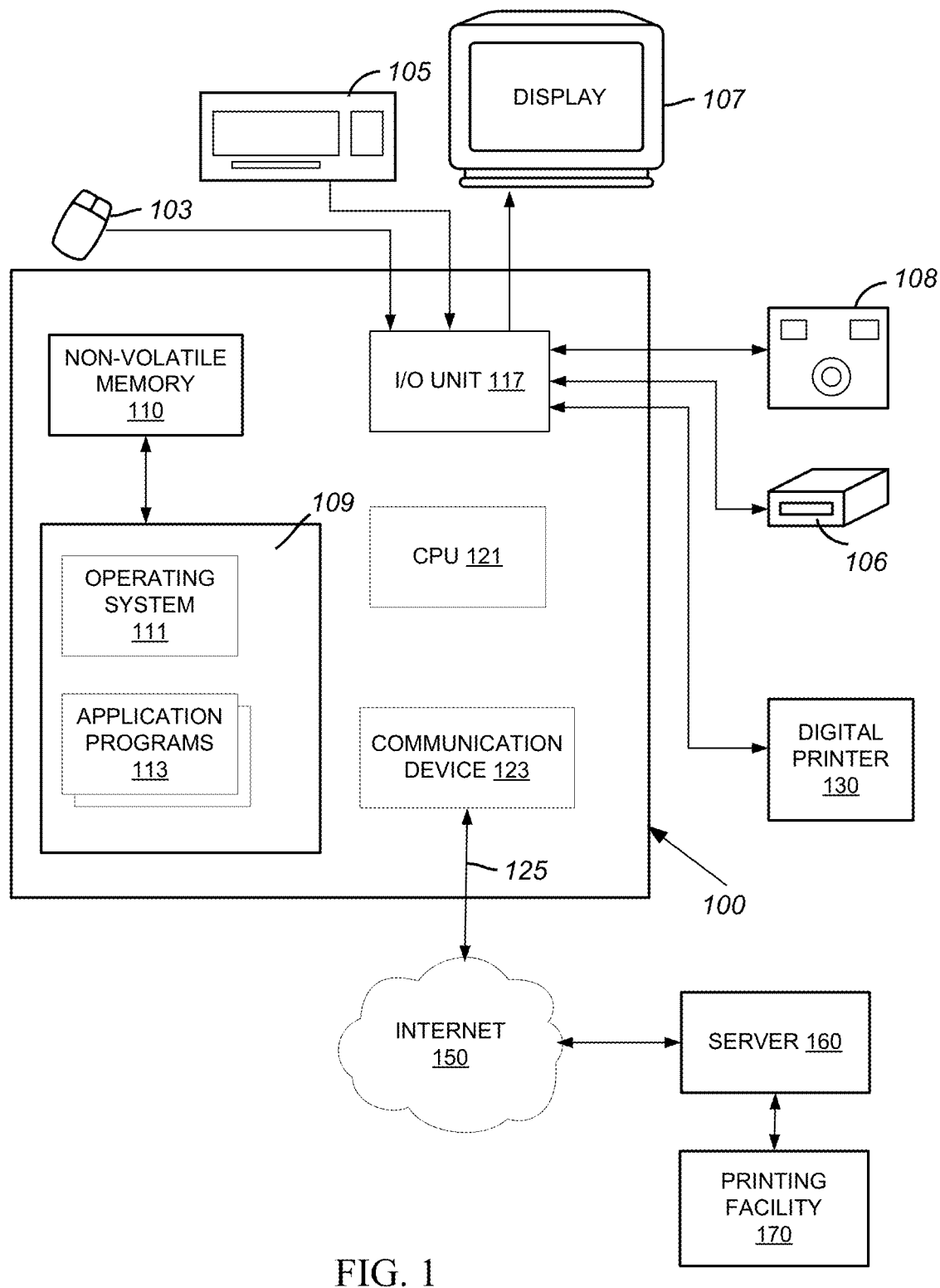
FIG. 1 is a block diagram of a computer network system compatible with the present invention.
Figure 2:
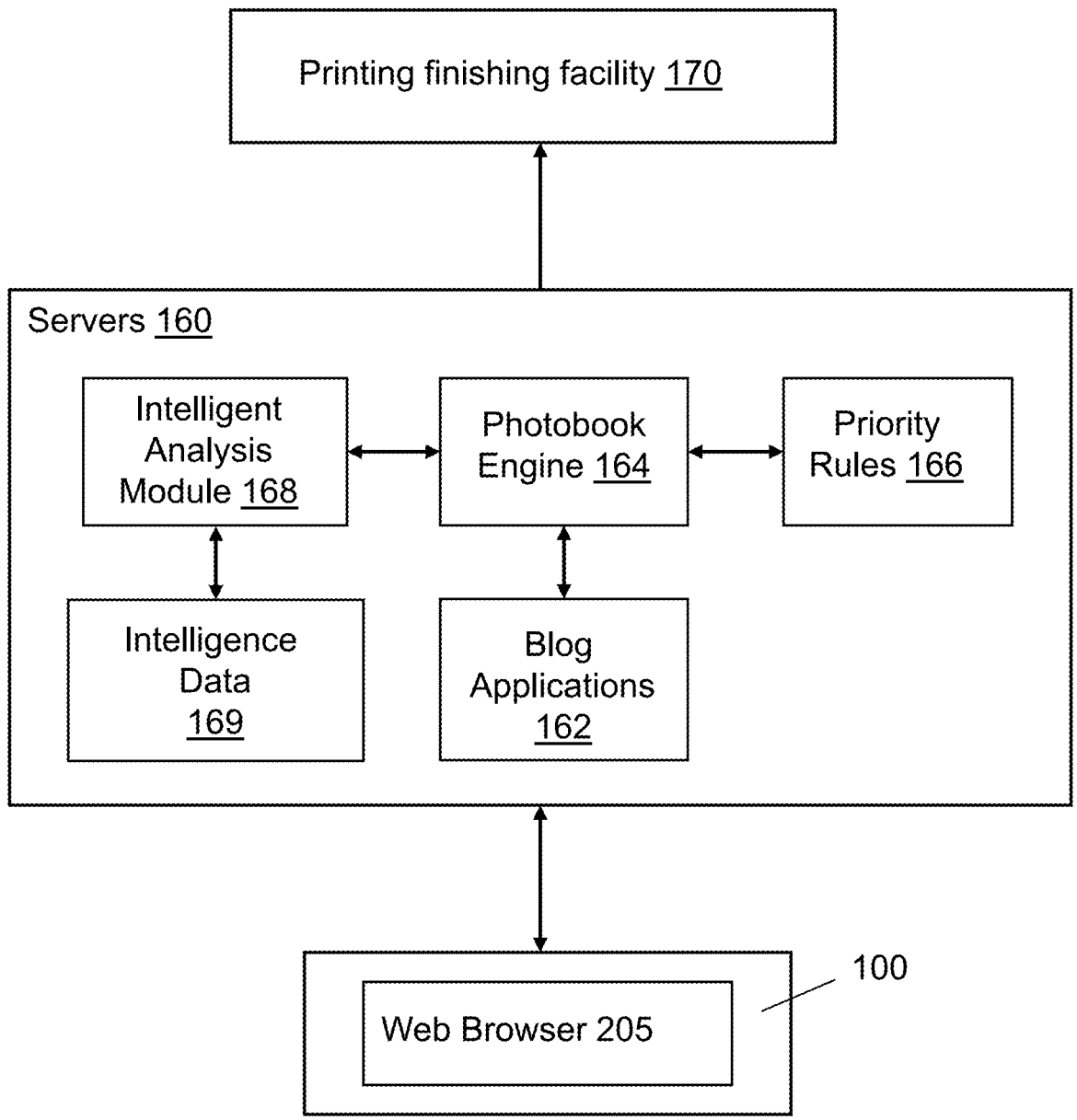
FIG. 2 shows details of the computer network system in FIG. 1.

Referring to FIGS. 1 and 2, a computer device 100 includes input/output (I/O) devices (e.g. mouse 103, keyboard 105, display 107), a central processor unit (CPU) 121, an I/O unit 117, and a memory 109 that stores data, an operating system 111, and application programs 113. The computer device 100 also includes non-volatile memory 110 and a communications device 123 for exchanging data with a network 127 via a communications link 125 such as a cable modem, DSL service or wireless Internet connection. The digital images captured by a digital camera 108 can be transferred to the non-volatile memory 110 via wired or wirelessly connections. The images can be uploaded from the computer device 100 to a server 160 via Internet 150. The computer device 100 can exist in different configurations such as a desktop computer, a laptop or tablet computer, a smart phone, etc. The computer device 100 can also include a network based system including servers, databases etc., which can provide service to remote users over a computer network such as the Internet.

Although large numbers of images are frequently captured by digital cameras, only a small fraction of the digital images are used in customized imaging products, which are available from image service providers such as Shutterfly, Inc. Customizable photo products can include photobooks, photo calendars, photo greeting cards, photo stationeries, photo mugs, photo T-shirt, and so on, which can provide significant enhanced ways for preserving people's treasured memories in addition to viewing images on electronic displays.

Additionally, significant obstacles exist even for creating and obtaining customizable photo products. The design of a photobook, for example, can take significant amount of time and effort. A user has to select images, often from thousands of image, for many pages including a cover page. The user needs to select a format (size and cover material) and a style for the photobook. The user needs to design or select layout and a background pattern for each page, sort images for different pages, and place images onto individual pages. The photobook design can take many iterative steps such as selecting suitable images, selecting layout, selecting images for each page, add text, which can often take hours to complete.

In the present invention, the term "photobook" refers to a book that includes multiple pages and at least one image on one of the pages, which may include photo book, photo scrapbook, photo calendars, etc. At least some of the pages include one or more images and text or image caption. The present invention concepts are also suitable for photo products or image products other than photobooks. The photo or image products can include multiple pages (i.e. faces or views) that each can display one or more images, such as, photo greeting cards, holiday cards, multi-face photo cards, photo mugs, photo T-shirts, photo aprons, single photo pages, photo collage pages, photo stationery, photo banners, photo mugs, photo mouse pads, photo key-chains, photo collectors, and photo coasters, etc.

The style and the format of the photo product can have default selections. For example, a photobook can have "everyday" and hardcover book style, and 8" by 8" for the photobook format. In some embodiments, the style and the format of the photobook can be selected based on knowledge of the images in the group. Specifically, an image property can be extracted from the group of identified images. For example, if the images are identified by a common tag label "Hawaii Vacation", a photobook style for vacation, or specifically for Hawaiian vacation, may be automatically selected. In another example, if the images identified are in an electronic album called "Molly's Birthday Party", a birthday photobook style can be automatically selected.

Still referring to FIGS. 1 and 2, the servers 160 can host a website to allow users to view, edit, share, archive images. The servers 160 can include blog applications 162 that can enable a user to create, edit, update, and publish blog pages at the website. Different users can view the blog page using an application such as web browser 205 on a computer device 100 such as a lap top computer, a personal PC, or a smart phone (e.g. iPhone).

In accordance with the present invention, the servers 160 include a photobook engine 164 coupled with the blog applications 162. The content and designs on the blog pages are analyzed by an intelligent analysis module 168 and then selected are based on a set of priority rules 166 and predetermined criteria. The intelligent analysis module 168 can retrieve information from intelligence data 169 or store analysis results in the intelligence data 169. The photobook engine 164 can generate designs of photobooks using the selected content and designs on the blog pages. The servers 160 are in communication with a printing and finishing facility 170 which can manufacture photo products such as photobooks based on the designs. The blog pages can be posted at a social network web site hosted by companies such as Shutterfly, Inc., Facebook, MySpace, Photobucket, Yahoo, and Google. The photobook design can be enabled by the photobook engine 164 at the same web site or a different website from the one in which the blog pages are posted.

Referring to FIGS. 2-4B, with the assistance of the blog applications 162, a user (i.e. the owner of the blog pages) can create blog pages 400, 405 at a web site and post one or more images 410 such as "Image A"-"Image F", text 420, and design objects 430 on the blog pages 400, 405.

Figure 3:
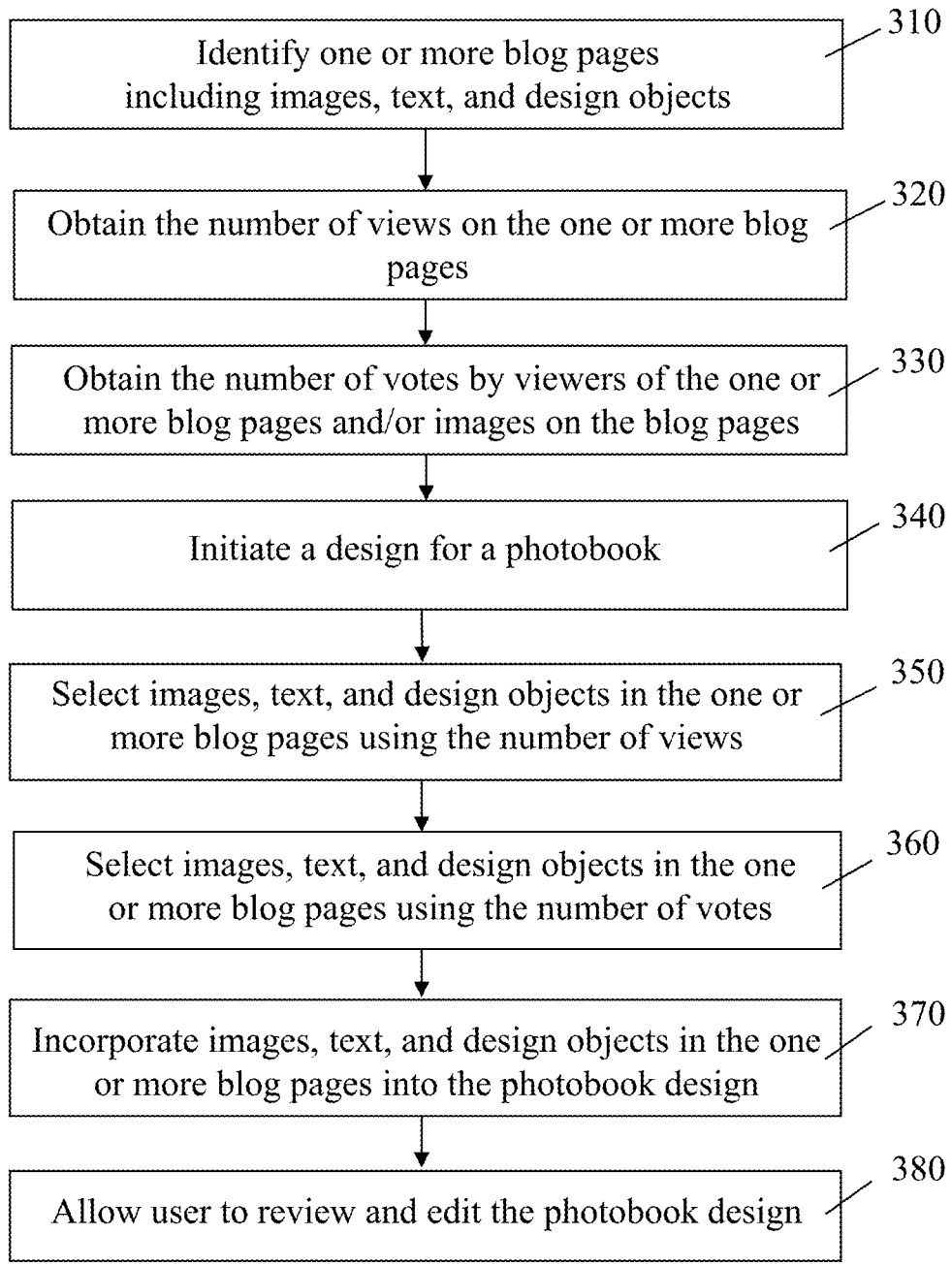
FIG. 3 shows a flow chart for creating a photobook based on the content of blog pages in accordance to the present invention.

The blog pages 400, 405 are identified and analyzed by the intelligent analysis module 168 (step 310, FIG. 3). The blog pages 400, 405 can be about a trip (e.g. a trip to Europe), a vacation, a baby, a graduation ceremony, wedding, sport games, a family reunion, etc. The blog pages 400, 405 can include comments 440 from viewers of the blog page. The text 420 can include description written by the owner of the blog pages, and comments from other users. The servers 160 (FIG. 2) can track the number of views 450 (or visits and click-throughs) that the blog page 400 or 405 or an image 410 has received. The number of views 450 is stored in the intelligence data 169 and analyzed by the intelligent analysis module 168 (step 320, FIG. 3). The web site can also tally the votes 460 (or likings, or favorites) by the viewers on the blog page 400 or 405, one or more images 410, the text 420, or the design objects 430. The number of votes 460 can be stored in the intelligence data 169 and analyzed by the intelligent analysis module 168 (step 330, FIG. 3).

Figure 5A:
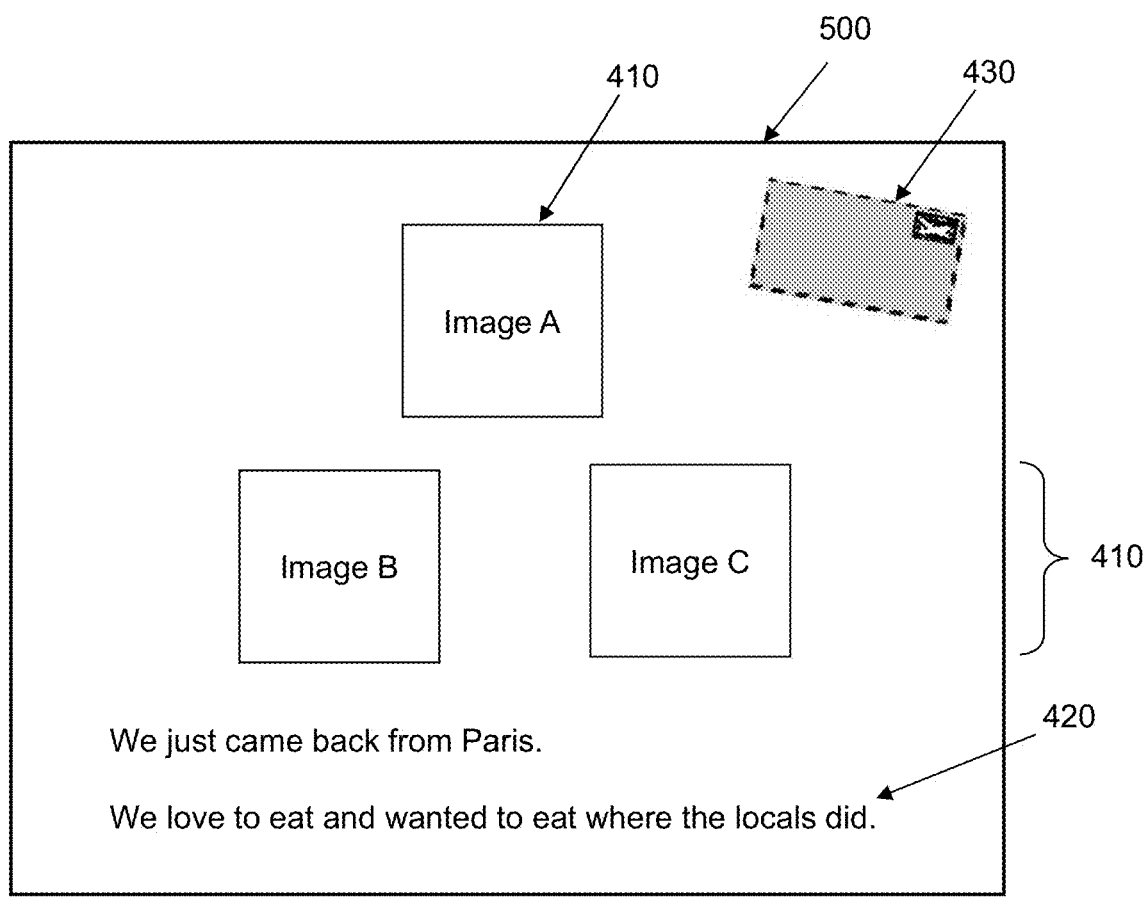
FIGS. 5A and 5B show exemplified photobook pages based on the content in the blog page in FIGS. 4A and 4B.
Figure 5B:
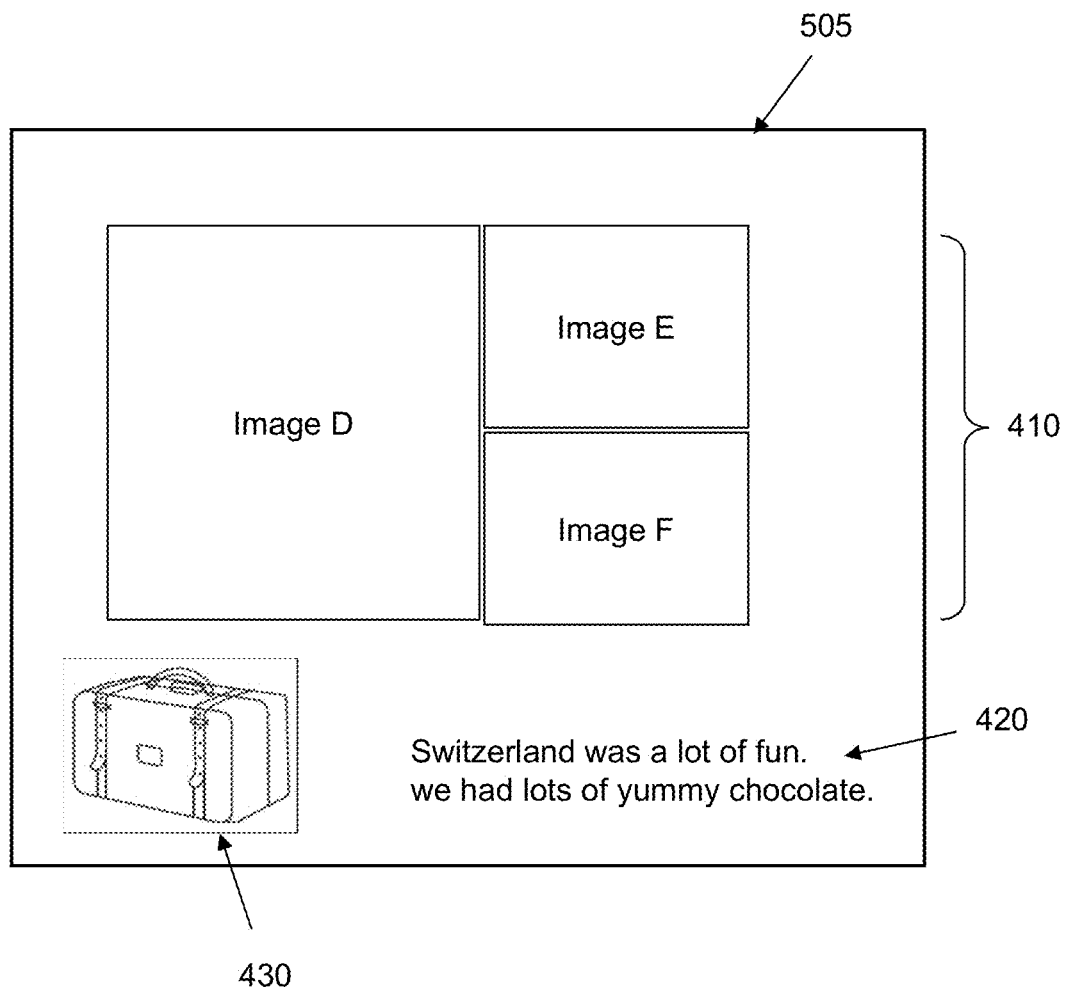

A photobook design is initiated for a user (step 340, FIG. 3). The initiation can be by a user, or automatically by the photobook engine 164. The user can be the same as the owner of the blog pages 400, 405. Alternatively, the user responsible for the creation of the photobook design can be different from the owner of the blog pages 400, 405. As shown in FIGS. 5A and 5B, a photo book design includes pages 500, 505 pages each including one or more images, text, and design objects. The photobook engine 164 can create at least a portion of a photobook design using the content from one or more blog pages 400, 405. In some embodiments, the photobook engine 164 identifies blog pages having content typically provided by the same user. The photobook engine 164 automatically incorporates the images 410, the text 420, the design objects 430, and optionally comments 440 on the blog pages 400, 405 into pages 500, 505 in the design of a photobook (step 370, FIG. 3). The photobook engine 164 can shorten the text 420 and incorporate an abbreviated version of text in the design of the photobook.

The user often has a large number of blog pages each covering a different event. Each blog page can include a plurality of images. Each image can also include multiple, and sometimes a large number of, comments.

In some embodiments, the blog pages 400, 405, the images 410, the text 420, the design objects 430, and optionally comments 440 on the blog pages 400, 405 are selected according to the views 450 (or visits and click-throughs) (step 350, FIG. 3). For example, the blog pages or images that received more visits (i.e. more popular) can be selected to be incorporated into photobooks over the ones that received fewer visits (less popular) (step 370, FIG. 3). This step can save the user from spending time on trimming out a large amount of blog content if they are all incorporated into a photobook design.

In some embodiments, the blog pages 400, 405, the images 410, the text 420, the design objects 430, and optionally comments 440 on the blog pages 400, 405 are selected according to the votes (or likings, or favorites) by the viewers (step 360, FIG. 3). For example, the blog pages that received more votes (i.e. more popular) can be selected to be incorporated into photobooks over the ones that received fewer votes (less popular) (step 370, FIG. 3).

Figure 4A:
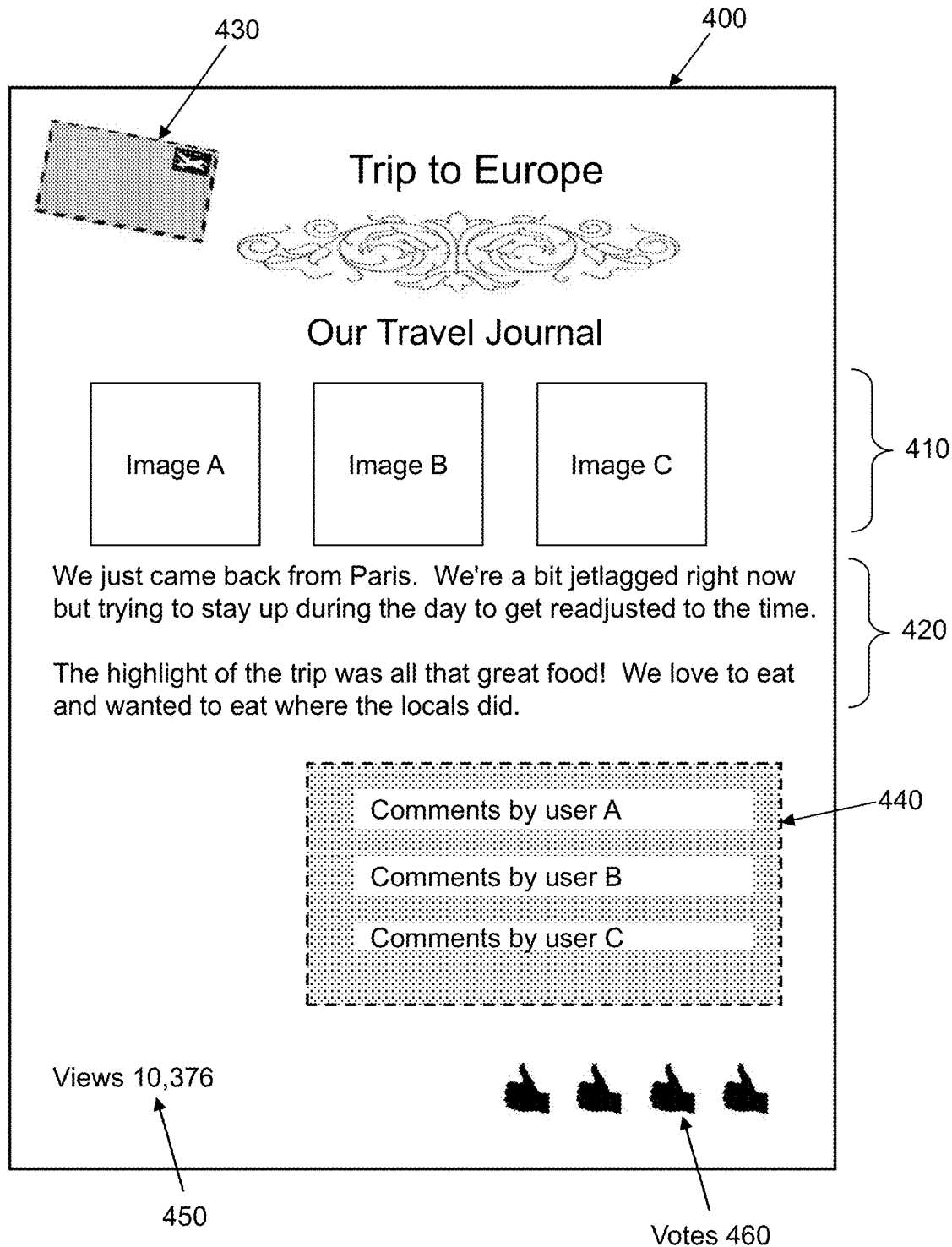
FIGS. 4A and 4B illustrate exemplified blog pages containing images, text, and design objects.
Figure 4B:
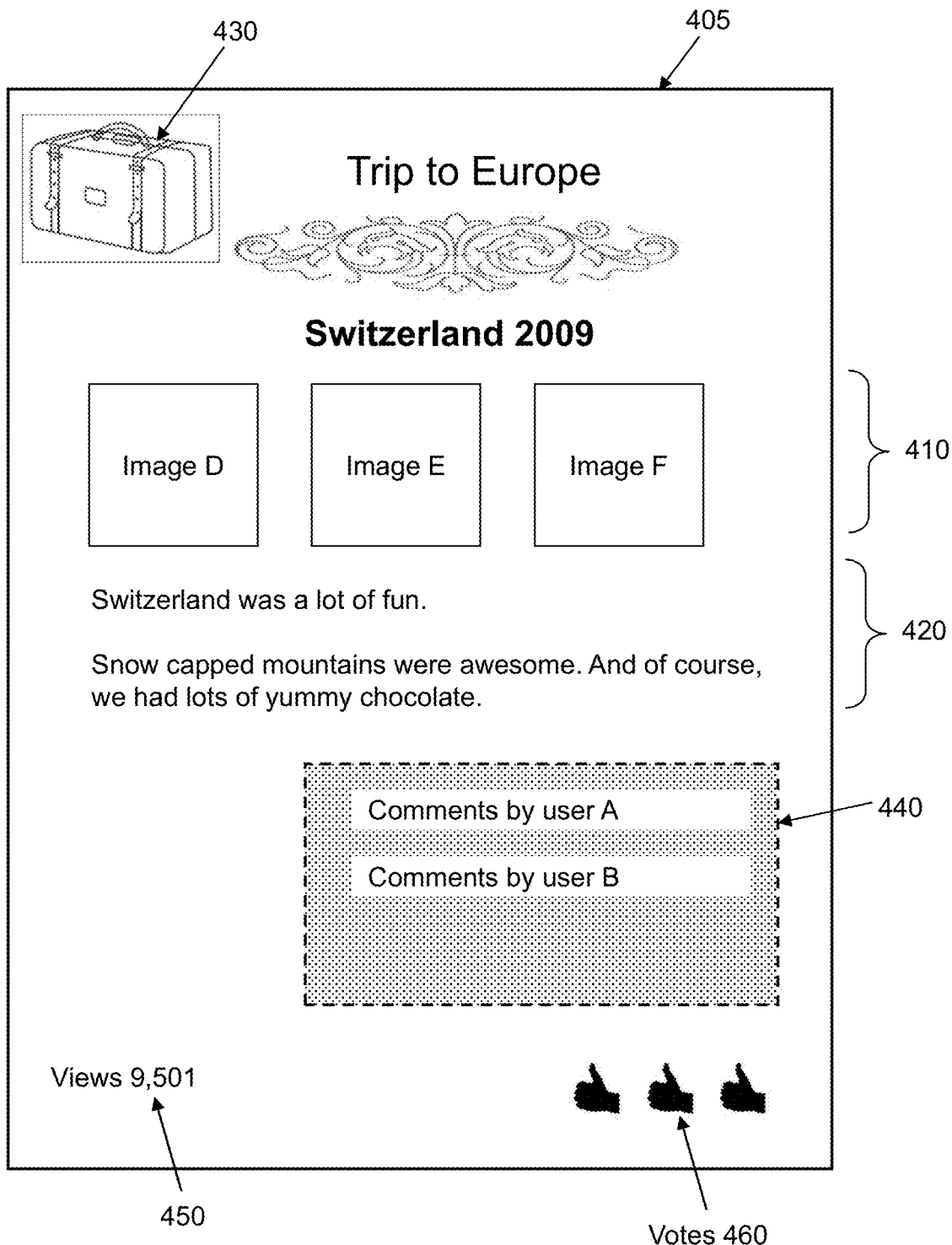
Figure 6A:
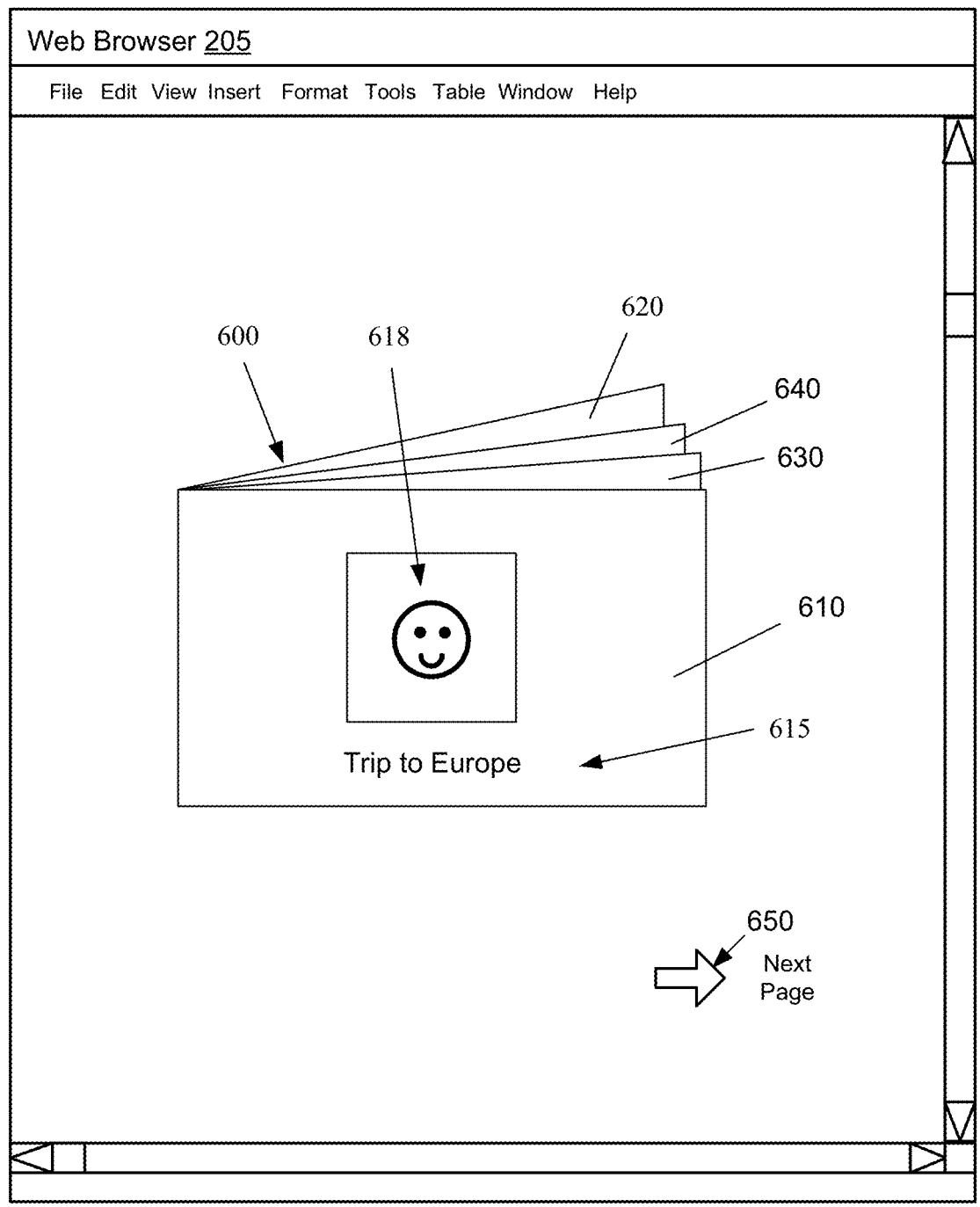
FIGS. 6A and 6B illustrate an exemplified photobook design created in accordance to the present invention.
Figure 6B:
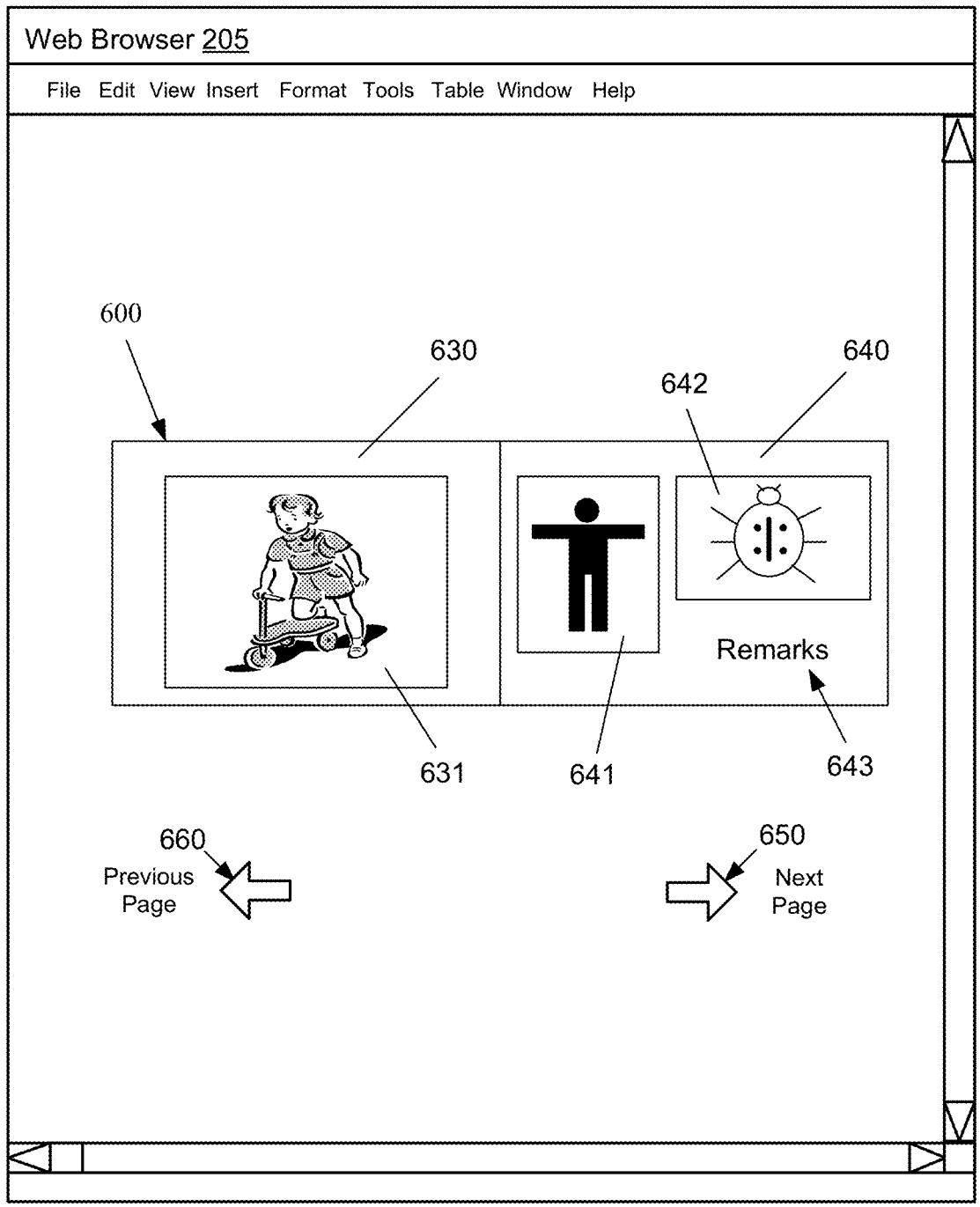

Referring to FIGS. 3, 6A, 6B, a photobook design 600 is viewable by the user in a web browser 205 on the computer device 100 (FIG. 1) during or after the completion of the photobook design 600 (step 380, FIG. 3). The photobook design 600 can include a front cover 610, a back cover 620, and a plurality of pages 630, 640. The book title can be automatically selected from the name of the image album 320. The front cover 610 can include a book title 615 and an image 618 selected from the images 410 (FIGS. 4A, 4B). The presentation of the photobook design 600 can include realistic illumination and texture to imitate effects of the materials in the selected book format. The user can click arrow buttons 650, 660 to view different pages of the photobook. The cover and different pages of the photobook design 600 can also be played automatically like a slide show. The user is allowed to edit the photobook design 600. The user can change, switch, or remove the images 618, 631, 641, and 642 on the book cover 610 and pages 630, 640. The user can also edit text and image on the pages (step 380, FIG. 3). After the user has reviewed and optionally edited the photobook design 600, the user can approve and save the photobook design 600. A physical photobook can be made according to the photobook design 600 at a printing finishing facility 170 (FIGS. 1 and 2).

It should be noted that the photobook engine 164 can automatically select page layout according to the type of content on the blog pages. For example, the number, the image sizes, and image formats (landscape and portrait) of images, the size of the text boxes, and the location and the dimensions of the design objects in a page layout can be tailored to match the corresponding properties of the images 410, the text 420, the design objects 430, and optionally comments 440 on the blog pages 400, 405 (FIGS. 4A, 4B). For example, an image 410 in landscape format and certain size will be reproduced on the page layout in landscape format and an appropriate size. A large text area is reserved for a longer text, etc.

The user has the freedom to edit and change the page layout, or select a different page layout (step 380, FIG. 3). Specifically, the images on the pages 500, 505 of the photobook design 600 can be selected to be consistent with the sizes of the images 410 on the blog pages 400, 405.

Figure 7:
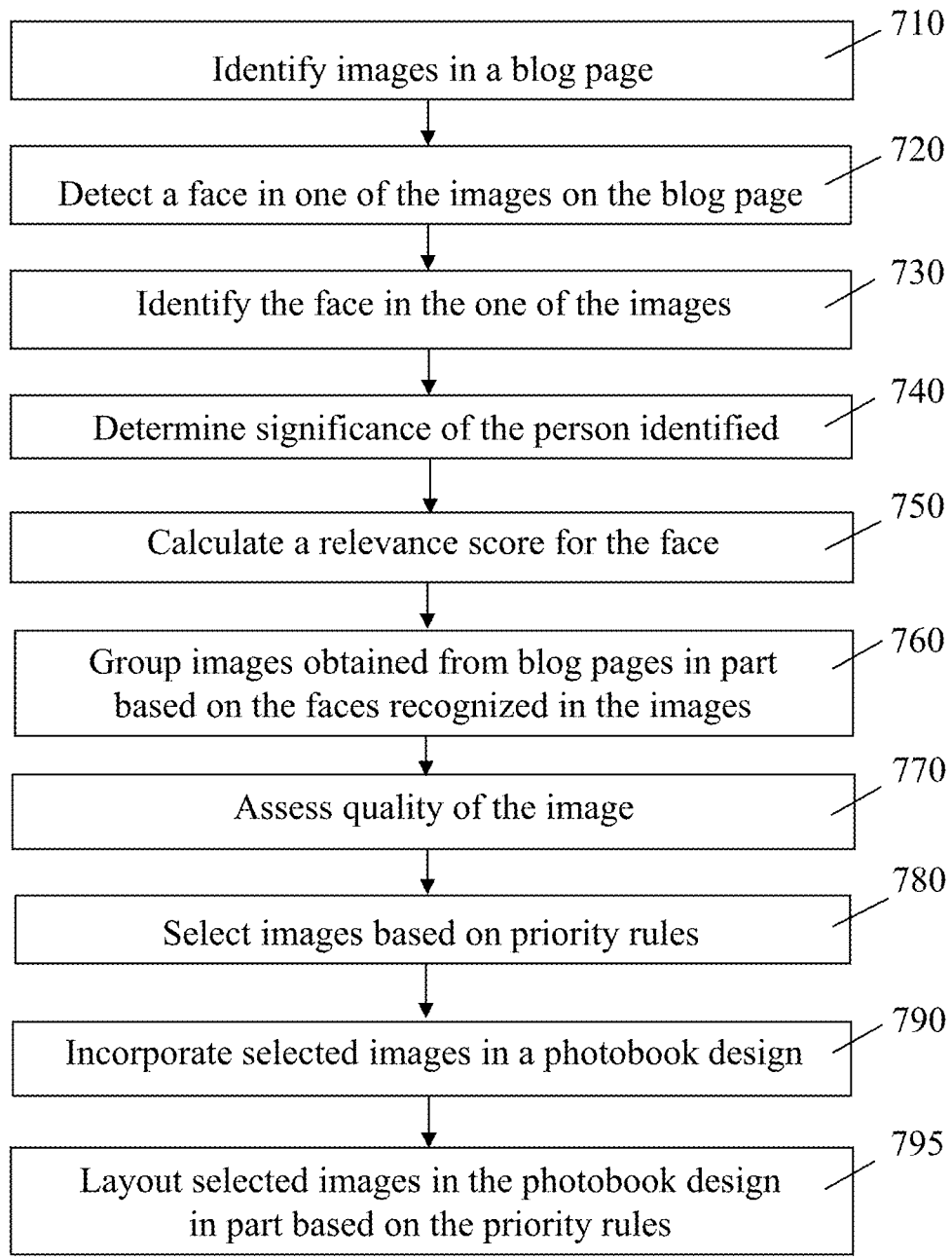
FIG. 7 shows another flow chart for selecting most relevant and desirable images from blog pages to create a photobook design in accordance to the present invention.

In some embodiments, referring to FIGS. 4A-4B and 7, a method is disclosed to select most relevant and desirable images 410 from blog pages 405 to create a photobook design. Images are identified in blog pages (step 710).

Figure 8:
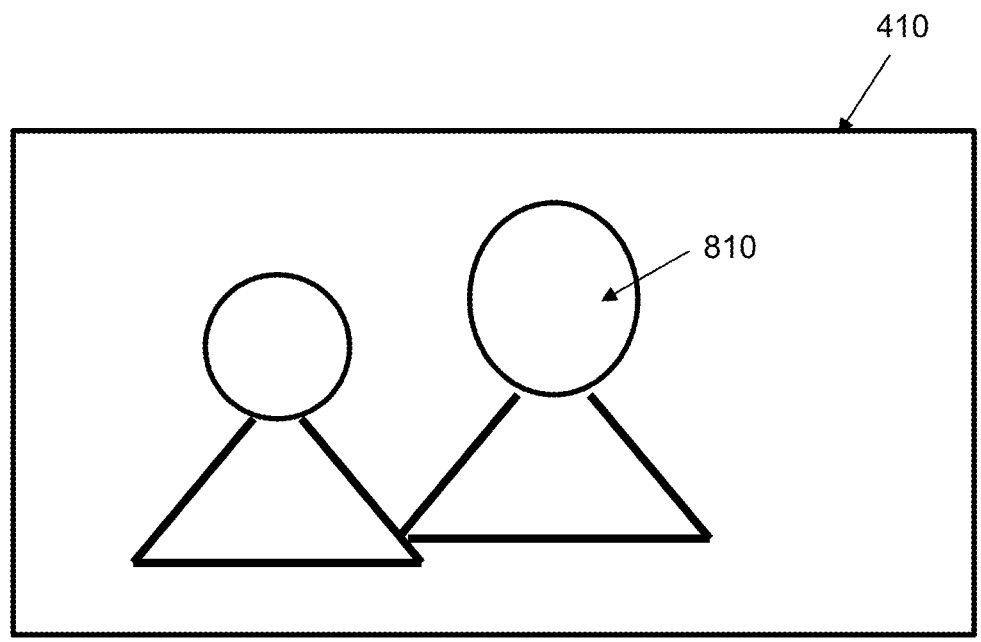
FIG. 8 illustrates selecting image from blog page based on face recognized.
Figure 9:
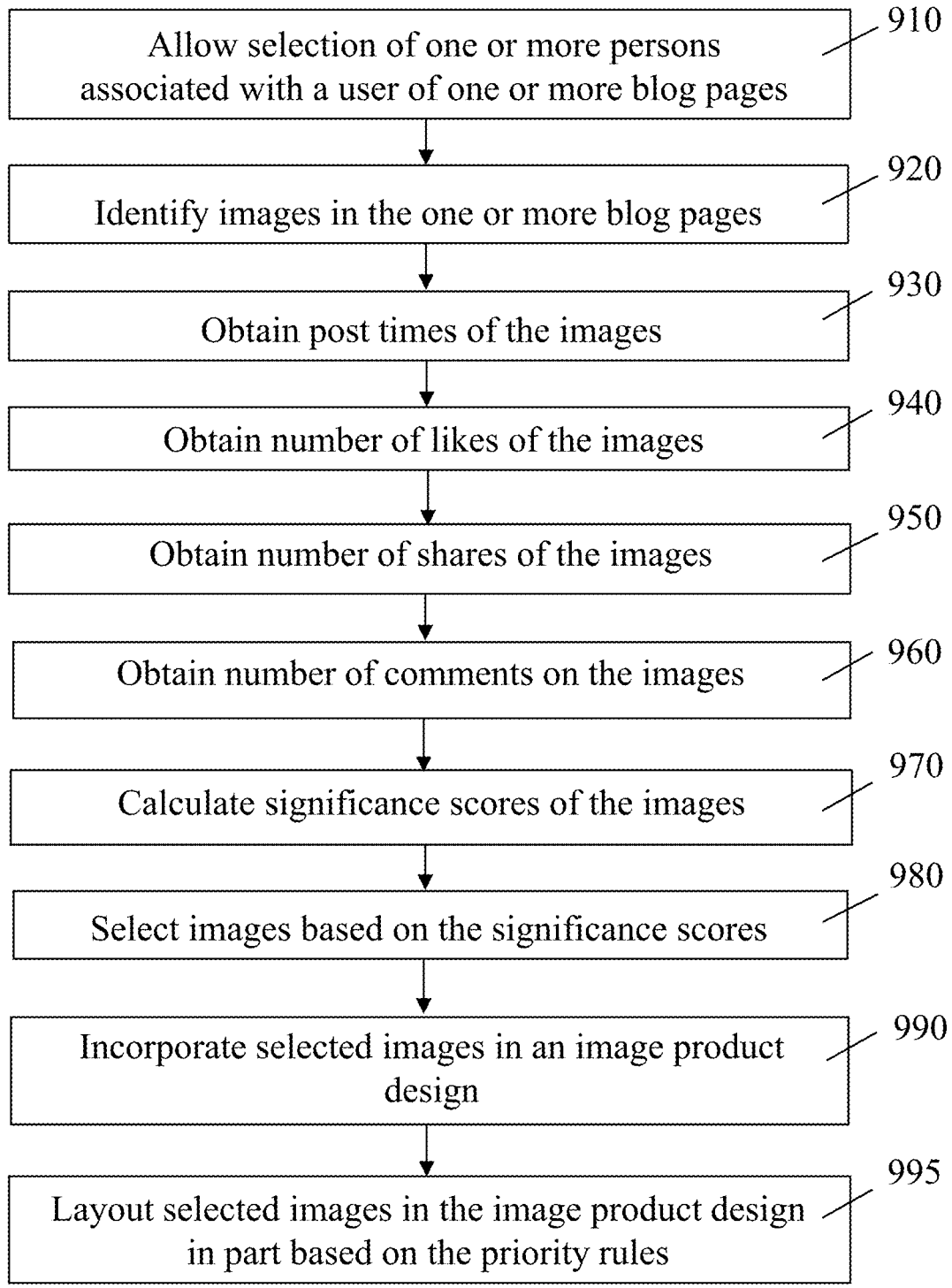
FIG. 9 is shows another flow chart for selecting content from blog pages to create a photo product design in accordance to the present invention.

Referring to FIGS. 2, 7, and 8, the selection of images from blog pages are based on a set of priority rules 166. The priority rules 166 can be based on the views, votes, likes, and visits received by the images, and related content received by the blog pages at the sharesite, as described above. The priority rules 166 can also be based on faces detected in the images. A face 810 is detected in the image 410 on the blog page by the intelligent analysis module 168 (step 720). The face is identified as a person (step 730). The face recognition can include one or more of the following steps. The face in the image 410 can be compared to face models of known persons already stored in or in association with the photobook engine 164. The face models (which can be stored in the intelligence data 169) are typically specific to a user or a user's family. A matching between the face in the image and pre-stored face models can be determined by a number of factors such as location, exposure, size, clarity, orientation, and facial expression such as smile of the face 810. Once a matching is found, the face is identified to be the person related to the face model. Details of face recognition and identification are disclosed in commonly assigned U.S. patent application Ser. No. 13/525,037, tilted "Assisted photo-tagging with facial recognition models", filed Jun. 12, 2012, by Johnson, et al., the disclosure of which is incorporated herein by reference.

Once a face is identified, the significance of the person associated with the face is determined (step 740). A significant person can be already labeled in association with the pre-stored face models. The significance of an identified person can also be learned and inferred from the frequency of appearances of the person on blog pages. A relevance score is calculated for the face identified based on predetermined criteria (step 750), which can include the significance of the person identified, the properties of the face image (location, exposure, size, clarity, and orientation, etc. within the image), and facial expression, etc. Higher priority is given to faces with high significance and more prominent appearance within the images. The images on the blog pages can be grouped in part based on the faces identified in the images (step 760).

The priority rules 166 can also be based on image quality of the images 410 on the blog pages 405. The qualities of the images 410 are assessed by the intelligent analysis module 168 (step 770) based on a number of factors such as blur detected (sharpness) in the image, contrast and lightness, intensity balance, vibrancy of colors, and scenes detected, etc. The intelligent analysis module 168 can also analyze and obtain photo-capture times and locations of the images 410 on the blog pages 405. The properties of the images 410 can laso be stored in the intelligence data 169.

Finally, the images 410 on the blog pages 405 are automatically selected by the intelligent analysis module 168 based on the set of priority rules 166 including image qualities, scores of the faces identified in the images, image capture times and locations, etc. (step 780). The priority rules are aimed at selecting images most relevant and desirable to the user. The selected images are incorporated into a photobook design (step 790) by the photobook engine 164 as shown in FIGS. 5A-6B.

The selected images are laid out in the photobook design by the photobook engine 164 in part based on the priority rules (step 795). Images selected from the blog pages having higher priority can be placed in higher visibility location and areas (large or more prominent) on a book page. The photo book cover, given its significance, typically receives an image having high priority. Images having same identified persons, or same identified scenes or colors can be placed adjacent to each other on a photobook design. Images can also be sequenced and clustered by their respective capture times and laid out on book pages accordingly. Details of face recognition and identification are disclosed in commonly assigned U.S. patent application Ser. No. 13/520,325, tilted "System and method for creating a collection of images", filed Jul. 2, 2012, by Bercovich, et al., the disclosure of which is incorporated herein by reference.

In some embodiments, referring to FIGS. 2, 4A-4B, and 9, a method is disclosed to select most relevant and desirable images 410 from blog pages 405 to create an image product design. The blog pages 405 can be one of multiple blog pages associated with a user at a Social Network site. Optionally, the user is allowed to select one or more persons associated with the user on the one or more blog pages (step 910). The one or more persons can for example include the user's close friends, or inner circle of friends, or family members. The one or more persons can also be from a specific circle of friends such as "college buddies" for whom a photobook is intended to be created.

Images are automatically identified in the one or more blog pages (step 920). If one or more persons have been selected, images comprising at least one of the one or more persons are identified. The one or more persons can be identified in the images by automatic detection and identification of faces as described above in relation to FIG. 8. The one or more persons can also be identified by their names that appear in the comments, tags, or descriptions in association with the images on the one or more blog pages. The times when the images were posted on the one or more blog pages are obtained (step 930) by the intelligent analysis module 168. Post times can be an indication for the significance of the images. For example, more recent photos may be more relevant for being used in a photo product. A photo product can include a photobook, photo calendar, a photo greeting card, or photo stationery.

Social data associated with the images are obtained (steps 940-960) by the intelligent analysis module 168. For example, the social data can include number of likes selected on the images by people who have viewed the images (step 940). The social data can include number of shares (if privacy control allows) of the images by people (step 950). The social data can include number of comments on the images by people (step 960).

A significance score is calculated for each of the identified images on the more or more blog pages (step 970). The significance score can be a function of the post time, and the numbers of likes, shares, and comments related to the images. The significance score can also depend on image quality, significance of the persons involved, as assessed by the intelligent analysis module 168, as described above in relation to FIG. 8. The calculation of the significance score can be based on priority rules 166. For example, images posted on the blog pages within last 3 months can be given 3 points; between from 3 to 6 months: 2 points; from 6 to 12 months: 1 point. A "Like" is worth 1 point; a Share is given 2 points; and a comment is given 3 points, and so on. Image quality can also be quantified by points. The significance score of an image can be the simple sum, weighted sum, square root of sum of squares, etc. of points of the individual measures (post time, numbers of likes, shares, and comments, image quality, relevance of faces).

The images on the one or more blog pages are selected by the intelligent analysis module 168 based on the significance scores of the images (step 980). Images with higher significance scores are selected over the ones with lower significance scores. The images can be selected up to a predetermined number which may be specific to each type of photo product. For a photobook, for example, up to 80 images are selected. The selected images are incorporated into a photobook design (step 990) as exemplified by the photobook engine 164 as shown in FIGS. 5A-6B.

The selected images are laid out in the photo product design by the photobook engine 164 in part based on the priority rules (step 995). Images selected from the blog pages having higher priority can be placed in higher visibility location and areas (large or more prominent) on a page. For example, a photo book cover, given its significance, typically receives an image having high priority. Images having same identified persons, or same identified scenes or colors can be placed adjacent to each other on a photobook design. Images can also be sequenced and clustered by their respective capture times and laid out on book pages accordingly. Details of face recognition and identification are disclosed in commonly assigned U.S. patent application Ser. No. 13/520,325, tilted "System and method for creating a collection of images", filed Jul. 2, 2012, by Bercovich, et al., the disclosure of which is incorporated herein by reference.

It should be understood that the presently disclosed systems and methods are suitable for creating photo products other than photobooks. The photo products can include multiple pages or views that each can display one or more images, such as photo books, photo calendars, photo scrapbooks, photo snapbooks, photo calendars, photobooks, and a multi-face photo card. The photo products can also include a single page or view for displaying one or more images, which can include, for example, photo greeting cards, holiday cards, stationery cards, photo mugs, photo T-shirts, photo aprons, single photo pages, photo collage pages, a photo stationery, photo banners, photo mugs, photo mouse pads, photo key-chains, photo collectors, and photo coasters etc.

Furthermore, it should be understood that the design of the photo products can incorporate other type of content on blog pages that are not mentioned above. Additionally, with proper permission, content from the blog pages of different users can also be incorporated into a user's photobook design. Moreover, the publication of the bog pages and the design of the photo products may be conducted at different websites.

What is claimed is:

1. A method for creating a photo product, comprising:
identifying, by an intelligence analysis server, images on one or more blog pages at a web site which are published by a blog application server, wherein the intelligence analysis server and the blog application server are both coupled with a photo product engine;
obtaining, by the intelligence analysis server, numbers of likes, or comments, or a combination thereof received on the images published by the blog application server;
automatically incorporating, by the photo product engine, at least one of the images published by the blog application server, into a layout of the photo product to create a design of the photo product based on a significance score that is calculated based on the number of likes, or comments, or a combination thereof;
allowing the design of the photo product created by the photo product engine to be reviewed;
sending the design of the photo product from the photo product engine to a printing finishing facility; and
manufacturing a physical photo product by the printing finishing facility according to the design of the photo product.

2. The method of claim 1, further comprising:
obtaining, by the intelligence analysis server, post times when the images are posted on the one or more blog pages; and
automatically selecting at least one of the images based in part on the post times.

3. The method of claim 1, further comprising:
obtaining, by the intelligence analysis server, number of shares of the images on the one or more blog pages; and
automatically selecting at least one of the images based in part on the number of shares.

4. The method of claim 1, further comprising:
allowing selection of one or more persons associated with a user of the one or more blog pages, wherein the one or more blog pages are posted by the user, wherein the step of identifying identifies images comprising at least one of the one or more persons.

5. The method of claim 1, wherein the images are automatically selected up to a predetermined number.

6. The method of claim 5, wherein the predetermined number is determined by the photo product.

7. The method of claim 1, wherein the step of automatically incorporating comprises:
determining the image formats of the image by the intelligence analysis server;
automatically selecting a page layout according to the image format of the image by the photo product engine; and
automatically incorporating the image into the page layout which forms a portion of the design of the photo product.

8. The method of claim 1, further comprising:
automatically selecting a layout based on the image identified on the one or more blog pages.

9. The method of claim 1, wherein the photo product comprises a photobook, a photo greeting card, or photo stationery.

10. The method of claim 1, further comprising:
receiving an order from the user for a physical photo product; and
making the physical photo product according to the design of the photo product at the printing finishing facility.

11. A method for creating a photo product, comprising:
identifying, by an intelligence analysis server, images on one or more blog pages at a web site which are published by a blog application server, wherein the intelligence analysis server and the blog application server are both coupled with a photo product engine;
automatically selecting one or more of the images on the one or more blog pages based on a set of priority rules by the intelligence analysis server, wherein the set of priority rules are based in part on the faces identified in the images;
automatically incorporating, by the photo product engine, the selected one or more images into a layout of the photo product to create a design of the photo product;
allowing the design of the photo product created by the photo product engine to be reviewed;
sending the design of the photo product from the photo product engine to a printing finishing facility; and
manufacturing a physical photo product by the printing finishing facility according to the design of the photo product.

12. The method of claim 11, further comprising:
obtaining, by the intelligence analysis server, post times when the images are posted on the one or more blog pages, wherein the set of priority rules are based in part on the post times.

13. The method of claim 11, further comprising:
obtaining, by the intelligence analysis server, number of shares of the images on the one or more blog pages, wherein the set of priority rules are based in part on the number of shares.

14. The method of claim 11, further comprising:
allowing selection of one or more persons associated with a user of the one or more blog pages, wherein the one or more blog pages are posted by the user, wherein the step of identifying identifies images comprising at least one of the one or more persons.

15. The method of claim 11, wherein the set of priority rules are further based in part on numbers of likes or comments received by the images.

16. The method of claim 11, further comprising:
calculating qualities of the images, wherein the priority rules are in part based on the qualities of the images.

17. The method of claim 11, wherein the images are automatically selected up to a predetermined number.

18. The method of claim 17, wherein the predetermined number is determined by the photo product.

19. The method of claim 11, further comprising:
incorporating the selected one or more images into a layout of the photo product by the intelligence analysis server in part based on the set of priority rules.

20. The method of claim 11, wherein the photo product comprises a photobook, a photo greeting card, or photo stationery.

\* \* \* \* \*